US012617315B2

(12) United States Patent
Xie et al.

(10) Patent No.: US 12,617,315 B2
(45) Date of Patent: May 5, 2026

(54) HYDROGEN FUEL CELL ELECTRIC VEHICLE ENERGY MANAGEMENT

(71) Applicant: FCA US LLC, Auburn Hills, MI (US)

(72) Inventors: Zhentao Xie, Auburn Hills, MI (US); Rudolf Kharpuri, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 133 days.

(21) Appl. No.: 18/443,922

(22) Filed: Feb. 16, 2024

(65) Prior Publication Data

US 2025/0262986 A1     Aug. 21, 2025

(51) Int. Cl.
B60L 58/40 (2019.01)
B60L 7/10 (2006.01)
B60L 50/75 (2019.01)
H01M 8/04537 (2016.01)
H01M 8/04858 (2016.01)
H01M 10/42 (2006.01)
(Continued)

(52) U.S. Cl.
CPC ................ B60L 58/40 (2019.02); B60L 7/10 (2013.01); B60L 50/75 (2019.02); H01M 8/04567 (2013.01); H01M 8/0494 (2013.01); H01M 10/425 (2013.01); H01M 10/482 (2013.01); H01M 16/006 (2013.01); B60L 2240/547 (2013.01); H01M 2010/4278 (2013.01); H01M 2220/20 (2013.01); H01M 2250/20 (2013.01)

(58) Field of Classification Search
None
See application file for complete search history.

(56) References Cited

U.S. PATENT DOCUMENTS

| | | | |
|---|---|---|---|
| 2008/0133076 A1* | 6/2008 | Formanski | B60W 10/28 307/64 |
| 2016/0014252 A1* | 1/2016 | Biderman | A61G 5/04 701/29.2 |

(Continued)

FOREIGN PATENT DOCUMENTS

| | | |
|---|---|---|
| JP | H06153314 A | 5/1994 |
| KR | 102325681 B1 | 11/2021 |

OTHER PUBLICATIONS

International Search Report and Written Opinion dated May 30, 2025, International Application No. PCT/US2025/015678, International Filing Date Feb. 13, 2025.

*Primary Examiner* — Daniel L Greene
(74) *Attorney, Agent, or Firm* — Jeremy J. Klobucar

(57) ABSTRACT

A fuel cell electric vehicle (FCEV) includes an electric traction motor configured to drive the FCEV and generate power through regenerative braking, a high voltage (HV) battery system including a HV bus and a HV battery configured to power the electric traction motor, and a fuel cell stack (FCS) configured to generate electricity to recharge the HV battery and/or power the electric traction motor. A powertrain control system for preventing overvoltage of the HV bus and HV battery includes a controller having one or more processors configured to control (i) a fuel cell power limit of the FCS, and (ii) a regenerative braking power limit of the electric traction motor. The controller is programmed to measure a voltage of the HV battery system, and selectively limit the fuel cell power limit and/or the regenerative braking power limit when the measure voltage exceeds a predetermined threshold.

13 Claims, 5 Drawing Sheets

(51) Int. Cl.
　　*H01M 10/48*　　　　(2006.01)
　　*H01M 16/00*　　　　(2006.01)

(56)　　　　　　References Cited

U.S. PATENT DOCUMENTS

| 2018/0215273 | A1 |  | 8/2018 | Tanaka |
| 2022/0131398 | A1 | * | 4/2022 | Herranz ................. B60L 53/22 |
| 2022/0379770 | A1 | * | 12/2022 | Salter ...................... H02J 3/001 |
| 2023/0023807 | A1 |  | 1/2023 | Heinla et al. |
| 2025/0135959 | A1 | * | 5/2025 | Jones ........................ B60L 3/04 |

\* cited by examiner

HYDROGEN FUEL CELL ELECTRIC VEHICLE ENERGY MANAGEMENT

FIELD

The present application relates generally to hydrogen fuel cell electric vehicle control systems and, more particularly, to hydrogen fuel cell electric vehicle energy management control system to prevent over-voltage.

BACKGROUND

A hydrogen fuel cell electric vehicle typically includes a battery pack that can be charged via regenerative braking or a hydrogen fuel cell stack. However, either charging method can potentially result in over-charging of the battery pack, which may result in faults that cause the battery pack to open contactors to disconnect from the vehicle or powertrain to protect itself. Once the contactors are open, the vehicle will lose traction power. Additionally, over-voltage may also occur in the high voltage bus, causing the fuel cell DC/DC converter to shut down to protect itself. Under low state of charge driving conditions, this may potentially result in loss of traction power or degraded driving performance once the fuel cell DC/DC shuts down. Accordingly, while such conventional systems do work well for their intended purpose, there is a desire for improvement in the relevant art.

SUMMARY

In accordance with one example aspect of the invention, a fuel cell electric vehicle (FCEV) is provided. In one example implementation, the FCEV includes an electric traction motor configured to drive the FCEV and generate power through regenerative braking, a high voltage (HV) battery system including a HV bus and a HV battery configured to power the electric traction motor, and a fuel cell stack (FCS) configured to generate electricity to recharge the HV battery and/or power the electric traction motor. A powertrain control system for preventing over-voltage of the HV bus and HV battery includes a controller having one or more processors configured to control (i) a fuel cell power limit of the FCS, and (ii) a regenerative braking power limit of the electric traction motor. The controller is programmed to measure a voltage of the HV battery system, and selectively limit the fuel cell power limit and/or the regenerative braking power limit when the measure voltage exceeds a predetermined threshold.

In addition to the foregoing, the described HEV may include one or more of the following features: wherein the controller is further programmed to measure (i) a voltage of individual battery cells of the HV battery and (ii) a voltage of the HV bus; wherein the controller is further programmed to continuously arbitrate the measured voltage of the individual battery cells and the measured voltage of the HV bus; and wherein the controller is further programmed to determine an arbitrated measured voltage, which is a maximum of the measured voltage of the individual battery cells and the measured voltage of the HV bus, where the HV bus voltage has the same scale of the battery cell voltage by using the HV bus voltage divided by the number of individual battery cells.

In addition to the foregoing, the described HEV may include one or more of the following features: wherein the controller includes a fuel cell power limit controller to control the fuel cell power limit of the FCS, and a regenerative brake power limit controller to control the regenerative braking power limit of the electric traction motor; wherein the fuel cell power limit controller and the regenerative brake power limit controller are propositional derivative (PD) controllers; and wherein the fuel cell power limit controller is programmed to reduce the fuel cell power limit when the arbitrated measured voltage exceeds a first threshold.

In addition to the foregoing, the described HEV may include one or more of the following features: wherein the regenerative brake power limit controller is programmed to reduce the regenerative braking power limit when the arbitrated measured voltage exceeds a second threshold, which is greater than the first threshold; wherein the fuel cell power limit is reduced to a minimum value before the regenerative braking power limit is reduced; and a motor control processor in signal communication with the electric traction motor and the controller, a battery pack control module in signal communication with the HV battery and the controller, and a fuel cell processor in signal communication with the FCS and the controller.

In accordance with another example aspect of the invention, a method of operating a powertrain control system to prevent over-voltage of a fuel cell electric vehicle (FCEV) is provided. The FCEV includes an electric traction motor, a high voltage (HV) battery system including a HV bus and a HV battery, a fuel cell stack (FCS), and a controller having one or more processors configured to control (i) a fuel cell power limit of the FCS and (ii) a regenerative braking power limit of the electric traction motor. In one example implementation, the method includes measuring, by the controller, a voltage of the HV battery system, and selectively limiting, by the controller, the fuel cell power limit and/or the regenerative braking power limit when the measured voltage exceeds a predetermined threshold.

In addition to the foregoing, the described method may include one or more of the following features: wherein measuring the voltage of the HV battery system includes measuring, by the controller, a voltage of individual battery cells of the HV battery, and measuring, by the controller, a voltage of the HV bus; by the controller, continuously arbitrating the measured voltage of the individual battery cells and the measured voltage of the HV bus; and determining, by the controller, an arbitrated measured voltage, which is a maximum of the measured voltage of the individual battery cells and the measured voltage of the HV bus, where the HV bus voltage has the same scale of the battery cell voltage by using the HV bus voltage divided by the number of individual battery cells.

In addition to the foregoing, the described method may include one or more of the following features: wherein the controller includes a fuel cell power limit controller to control the fuel cell power limit of the FCS, and a regenerative brake power limit controller to control the regenerative braking power limit of the electric traction motor; reducing, by the fuel cell power limit controller, the fuel cell power limit when the arbitrated measured voltage exceeds a first threshold; reducing, by the regenerative brake power limit controller, the regenerative braking power limit when the arbitrated measured voltage exceeds a second threshold, which is greater than the first threshold; wherein the fuel cell power limit is reduced to a minimum value before the regenerative braking power limit is reduced; and wherein the FCEV further includes a motor control processor in signal communication with the electric traction motor and the controller, a battery pack control module in signal communication with the HV battery and the controller, and a fuel cell processor in signal communication with the FCS and the controller.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, a hydrogen fuel cell electric vehicle (FCEV) powertrain includes an electrified propulsion system with a high voltage (HV) battery system, which can be recharged via regenerative braking or the fuel cell stack (FCS). Such recharging methods may result in an over-charging or over-voltage scenario in the battery pack or the HV bus. Accordingly, described herein are systems and methods to prevent the HV battery pack and HV bus crossing an over-voltage threshold by managing the power limits of the FCS power and the regenerative braking power.

Figure 1:
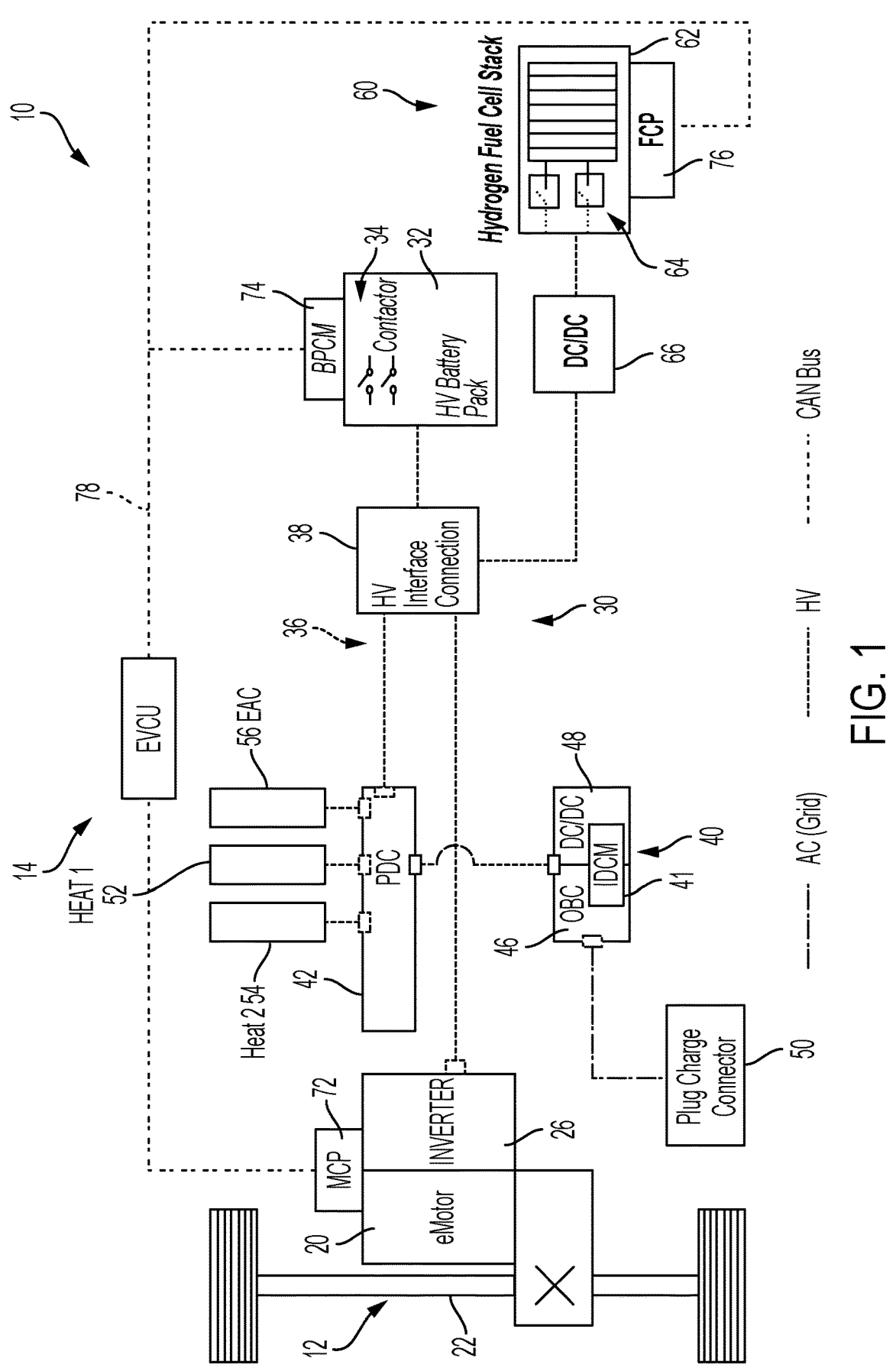
FIG. 1 is a schematic illustration of an example fuel cell electric vehicle (FCEV) architecture in accordance with the principles of the present application.

With initial reference to FIG. 1, a schematic diagram of a fuel cell electric vehicle (FCEV) 10 is illustrated having an electrified powertrain 12 and a powertrain control system 14 according to example implementations of the disclosure. In the illustrated example, the powertrain 12 generally includes one or more electric traction motors 20 configured to selectively provide drive torque to a front axle 22 and/or a rear axle (not shown). The electric motor 20 is electrically coupled to a power inverter module (PIM) 26.

To provide electric power to the electric traction motor 20, the FCEV 10 includes a high voltage (HV) battery system 30 and a hydrogen fuel cell system 60. The HV battery system 30 includes a HV traction battery 32 (e.g., 48V) to power high voltage loads such as the electric motor 20. A contactor 34 is included as an electromechanical switching device utilized to selectively connect the HV battery 32 to a HV bus 36 of the high voltage battery system 30. In some examples, the contactor 34 is integrated with the HV battery 32. A HV interface connection 38 is electrically connected to the HV battery 32 and is configured to combine the HV power sources (HV battery 32 and fuel cell system 60) together to support the load of the HV bus 36. During charging, the HV interface connection 38 combines the power of the electric motor 20 and fuel cell system 60 to charge the HV battery 32.

In the example embodiment, the HV battery system 30 also generally includes an onboard charger system 40 and a power distribution center (PDC) 42. The onboard charger system 40 includes an integrated dual charge module (IDCM) 44 with an onboard charger 46 and a DC/DC converter 48. The onboard charger system 40 is configured to support charging of the HV battery 32 from a wall charger 50. The onboard charger system 40 is electrically coupled to the PDC 42, which is electrically coupled to the HV interface connection 38, as well as a Heat1 52, Heat2 54, and electric air compressor (EAC) 56.

The PDC 42 includes various components such as fuses, relays, electronic control units, etc. to regulate and protect the electrical system. The PDC 42 is configured to ensure that electrical power is distributed efficiently to the various systems and components of the vehicle 10, such as the propulsion systems, accessories lighting, heating, cooling, etc. Heat1 52 and Heat2 54 are heaters, which are utilized to control the operating temperature of components as well as ambient temperature.

With continued reference to FIG. 1, the hydrogen fuel cell system 60 generally includes a hydrogen fuel cell stack (FCS) 62, which is fluidly coupled to a hydrogen fuel source and an oxygen fuel source (not shown). In one example, the FCS 62 is a proton exchange membrane (PEM) fuel cell stack formed by stacking a plurality of fuel cells, which are configured to generate electricity by electrochemical reactions of a fuel gas (e.g., hydrogen) and an oxygen containing gas (e.g., ambient air). As is well known in the art, each fuel cell includes an electrolyte membrane disposed between an anode and a cathode. It will be appreciated, however, that the hydrogen fuel cell system 60 described herein may be utilized with various other types of fuel cells.

In the example embodiment, a contactor 64 is included as an electromechanical switching device utilized to selectively connect the FCS 62 to the HV bus 36. In some examples, the contactor 64 is integrated with the FCS 62. The FCS 62 is electrically connected to the HV interface connection 38 via a DC/DC converter 66. In this way, the FCS 62 is configured to generate electricity by electrochemical reaction to provide power to the HV battery 32 for recharging, and/or to the electric motor 20 for operation thereof.

With continued reference to FIG. 1, the powertrain control system 14 includes a controller 70, such as an electric vehicle control unit (EVCU), for preventing over-voltage by managing the power limits of the hydrogen fuel cell stack power and the regenerative braking power, as described herein in more detail. In the example embodiment, the hybrid powertrain 12 is controlled by the powertrain control system 14, which generally includes the controller 70 in signal communication with a motor control processor (MCP) 72, a battery pack control module (BPCM) 74, and a fuel cell processor (FCP) 76.

The controller 70 is a central supervisory control configured to communicate with various components/modules of the hybrid powertrain 12 via a CAN bus 78. The electric motor 20 is directly controlled by the MCP 72, which is a controller configured for bi-directional communication with the controller 70 via the CAN bus 78. The controller 70 is configured to control the electric motor 20 by forwarding signals, such as operation state, torque command, and voltage setpoints to the MCP 72, and the MCP 72 provides feedback signals to the controller 70 related to the electric motor 20 such as operation status, output current, and voltage. Additionally, the MCP 72 receives commands from controller 70 to control the PIM 26 in a motor mode or a generator mode, as well as to control the power of discharge or charge. The MCP 72 may monitor the motor 20 and PIM 26 status, current, voltage, and temperature for feedback to the controller 70.

In the example embodiment, the BPCM 74 is a control module of the HV battery system 30 and is configured to monitor the HV battery pack voltage, current, and temperature, as well as estimate the battery pack SOC, state of health (SOH), and power limits. The BPCM 74 monitors the HV battery system 30 and sends one or more data signals to the controller 70 related to such monitoring. Additionally, if the battery pack cell voltage or DC/DC converter output voltage is too high, the BPCM 74 is configured to command the contactor 34 to open to protect the system.

In the example implementation, the FCP 76 is a control module of the fuel cell system 60 and is configured to communicate with controller 70 to control the FCS 62 to reach a desired target output power. The FCP 76 is also configured to monitor the fuel cell status (e.g., voltage, current, and temperature) and provide signals indicative thereof to the controller 70.

Figure 2A:
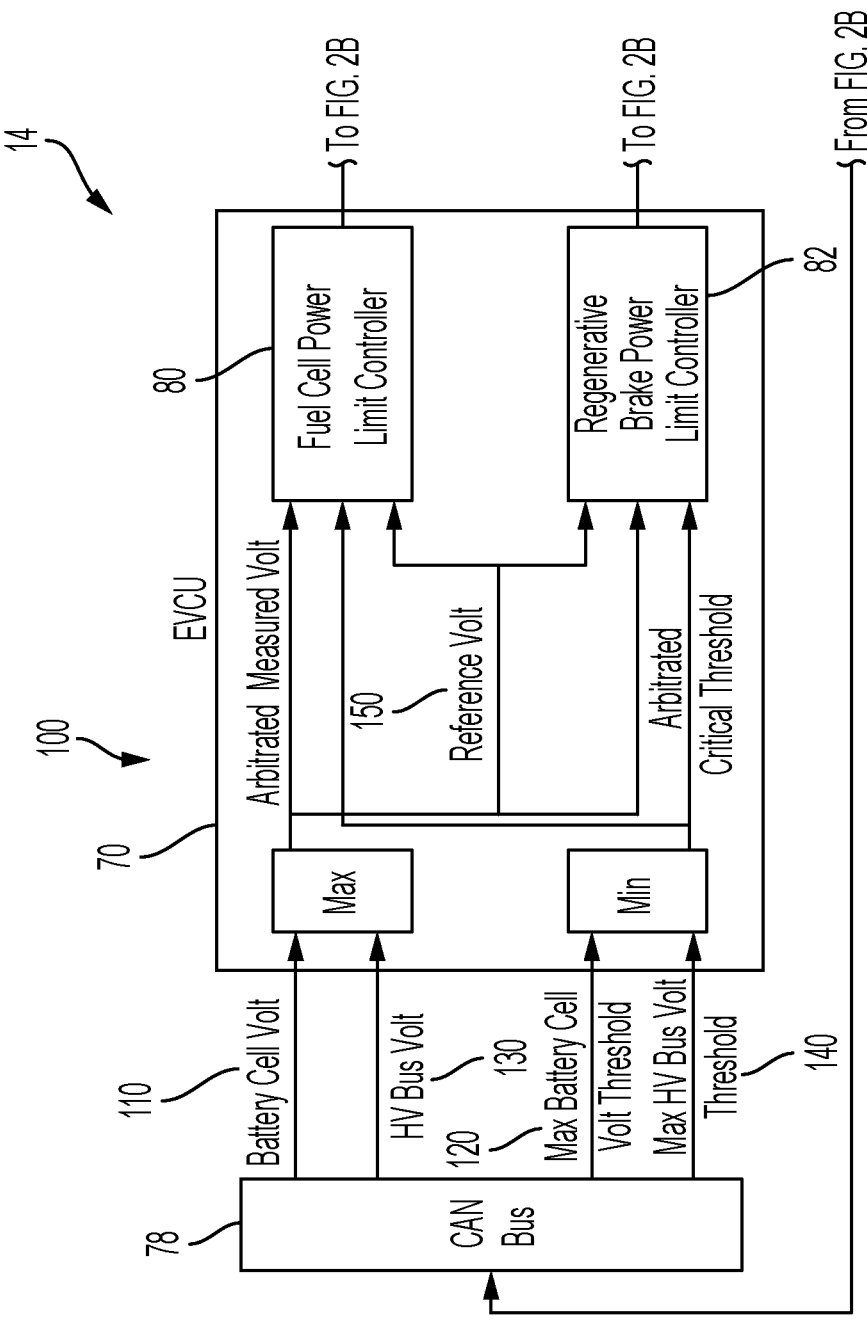
FIGS. 2A-2B are a schematic illustration of an example control architecture of the FCEV shown in FIG. 1, in accordance with the principles of the present application.
Figure 2B:
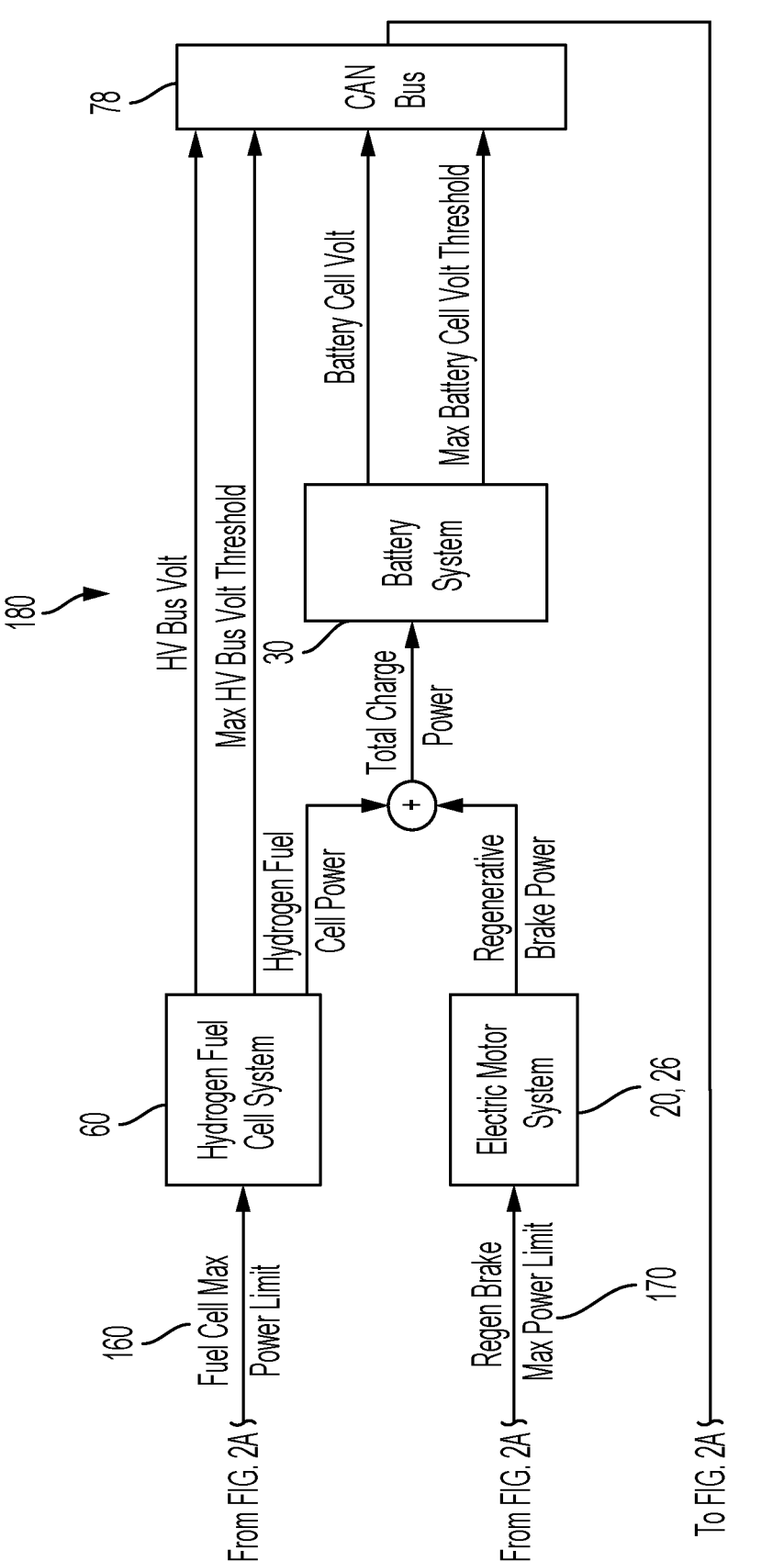

With reference now to FIG. 2, an example control architecture 100 of the powertrain control system 14 for preventing battery cell or HV bus over-voltage is described in more detail. The supervisory controller 70 includes a fuel cell power limit controller 80 and a regenerative brake power limit controller 82 to respectively manage the output power limits (e.g., how much power provided to HV battery 32) of the FCS 62 and the electric motor 20.

When the vehicle 10 is operational, there are two power sources, the regenerative brake and the FCS 62. However, if the battery cell voltage or HV bus voltage is above a threshold voltage, the contactors 34 are opened to protect the HV battery 32 or the DC/DC converter 66 stops working. To prevent over-voltage, the controller 70 is configured to control fuel cell power output and regenerative braking power output. As such, two separate closed loop controls are provided for the regenerative brake and the FCS. In the example embodiment, the fuel cell power limit controller 80 and regenerative brake power limit controller 82 are proportional derivative (PD) controllers.

As shown, the controller 70 receives signals from CAN bus 78 indicating a measured battery cell voltage 110, a battery cell voltage maximum voltage threshold 120, a measured HV bus voltage 130, and a HV bus maximum voltage threshold 140. In the example embodiment, the battery cell voltage maximum threshold voltage 120 and HV bus maximum voltage threshold 140 may be internally calculated or may be a static value based on battery pack and DC/DC component specifications. In one example, the controller 70 is in signal communication with one or more sensors (not shown) configured to monitor and provide voltage readings at each battery cell of the HV battery 32 and the HV bus 36.

The controller 70 then combines the measured battery cell and HV bus voltages 110, 130 and sends as one signal input (Arbitrated Measured Volt) to the fuel cell power limit controller 80 and regenerative brake power limit controller 82. In the example embodiment, to combine the readings into a similar scale, the measured HV bus voltage is divided by the number of battery cells in the HV battery 32. For example, the Arbitrated Measured Volt=max(Battery Cell Voltage, HV Bus Voltage), where the HV Bus Voltage has the same scale of Battery Cell Voltage by using the actual HV Bus Voltage divided by the number of battery cells or modules.

Similarly, the controller 70 combines the battery cell and HV bus voltage maximum thresholds 120, 140 and sends as one signal input (Arbitrated Critical Threshold) fuel cell power limit controller 80 and regenerative brake power limit controller 82. For example, the Arbitrated Critical Threshold=min(Max Battery Cell Voltage Threshold, Max HV Bus Voltage Threshold), where the Max HV Bus Voltage Threshold also has the same scale of Max Battery Cell Voltage Threshold by using the actual value divided by the number of battery cells or modules. Additionally, the fuel cell power limit controller 80 and regenerative brake power limit controller 82 each receive a signal indicating a reference voltage 150, which is a calibrated value or safe buffer value based on the system requirement, to prevent reaching the over-voltage threshold.

Based on the previously measured/determined values, the controller 70 provides a fuel cell max power limit 160 (Threshold1) to the hydrogen fuel cell system 60, and a regen brake max power limit 170 (Threshold2) to the electric motor 20. These are the max power limits to prevent over-voltage. As such, the hydrogen fuel cell system 60 and electric motor 20 provide power at or below the max power limits 160, 170 to the HV battery system 30. The hydrogen fuel cell system 60 and the HV battery system 30 subsequently send signals 180 to the HV bus 36 indicating measured battery cell voltage 110 and HV bus voltage 130, and maximum battery cell voltage threshold 120 and maximum HV bus voltage threshold 140. The cycle then repeats.

Figure 3:
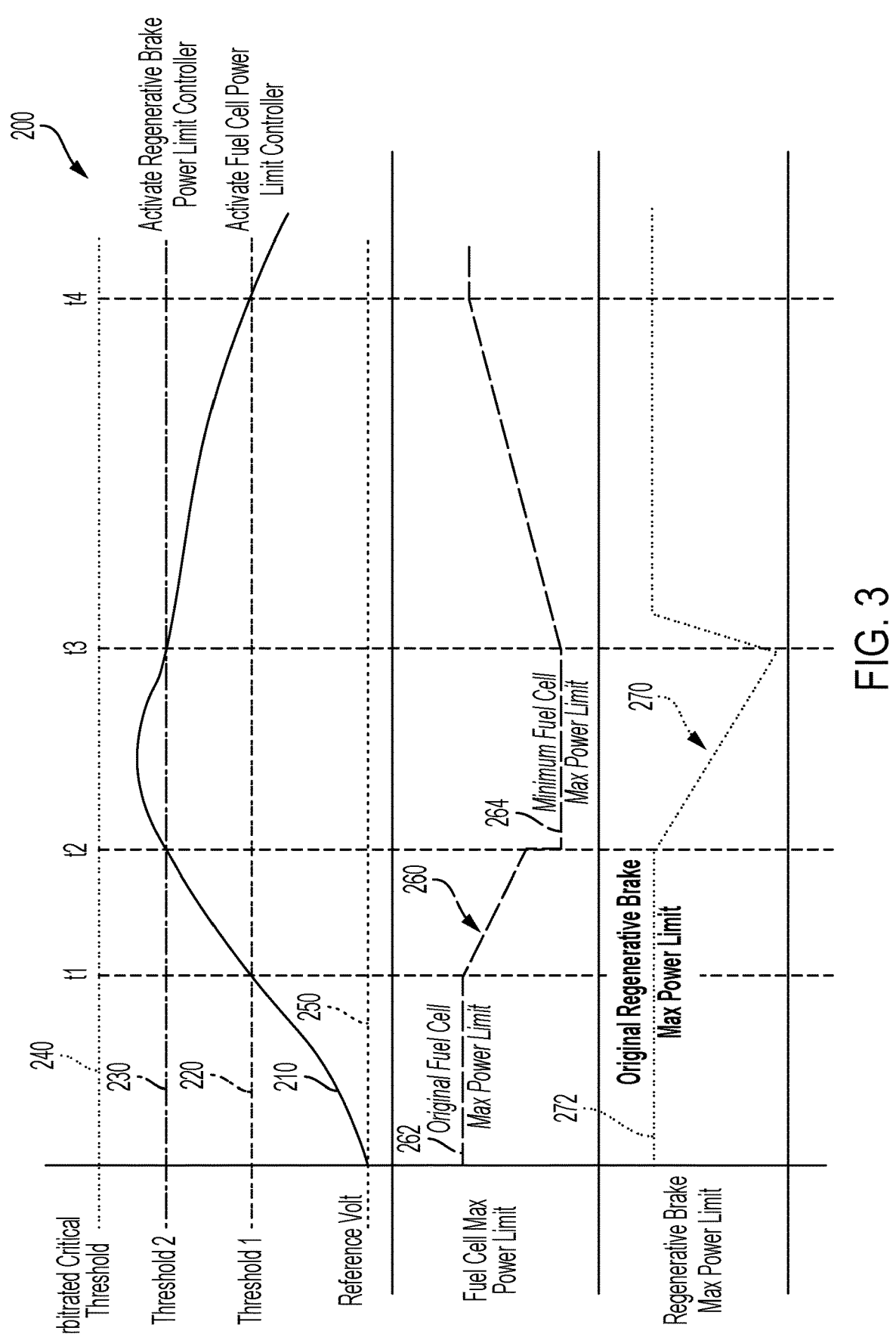
FIG. 3 is an example graph illustrating an example control sequence of the FCEV shown in FIG. 1, in accordance with the principles of the present application.
Figure 4:
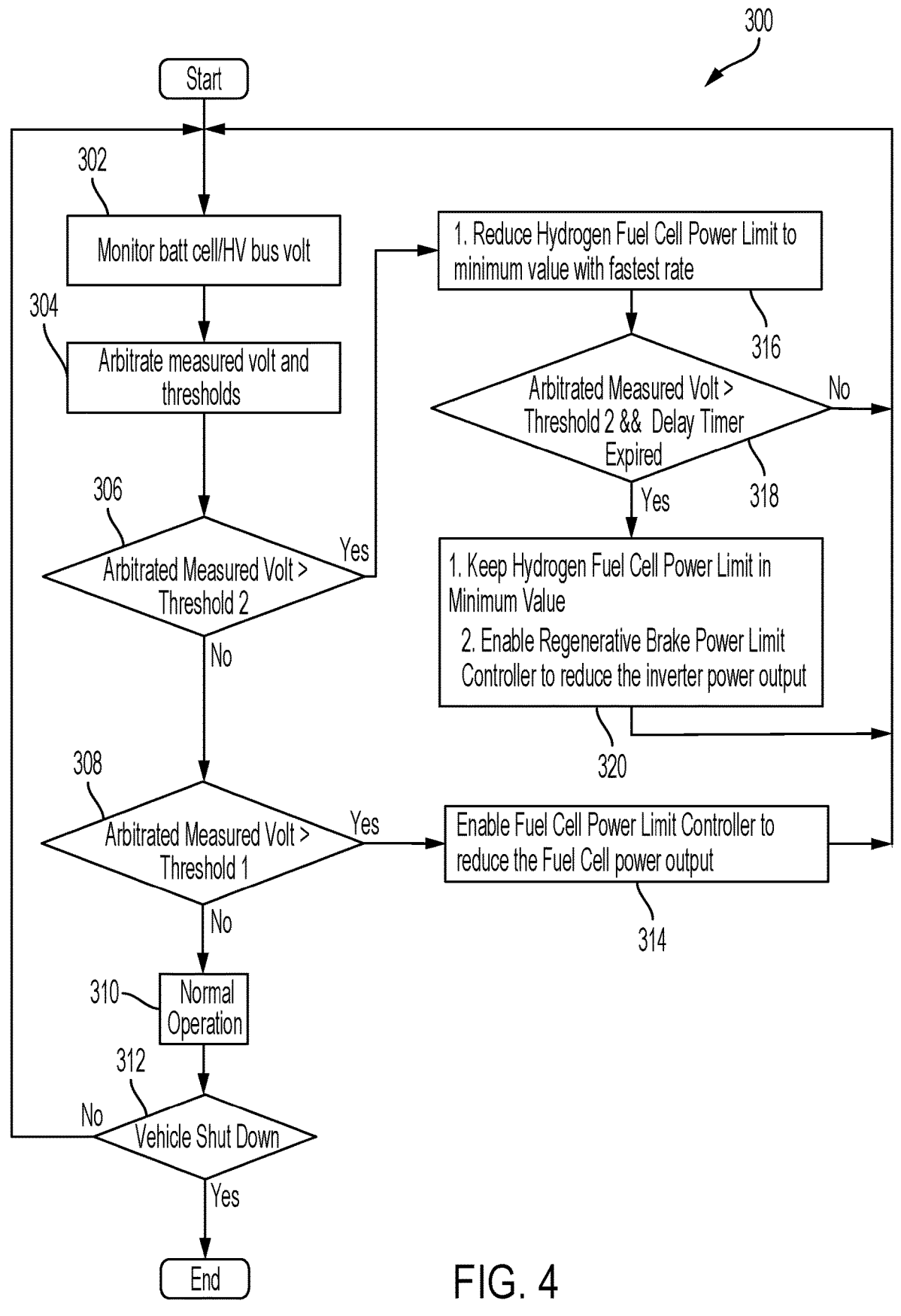
FIG. 4 illustrates an example control logic flow for operating a powertrain control system of the FCEV shown in FIG. 1, in accordance with the principles of the present application.

With reference now to FIGS. 2-4, an example operation of the powertrain control system 14 to prevent battery cell and HV bus over-voltage by managing the power max power limits of the hydrogen fuel cell stack power and regen braking power is described in more detail. In general, the powertrain control system 14 performs two functions. The first function includes voltage sensor readings and threshold arbitration. Because the individual battery cells of HV battery 32 and the HV bus 36 have separate sensor measurements and failure thresholds, the first function is configured to arbitrate the sensor readings and thresholds between the battery cells of HV battery 32 and the HV bus 36 to determine the previously designated Arbitrated Measured Volt and Arbitrated Critical Threshold.

The second function includes power limit controls for the hydrogen fuel cell system 60 and the electric motor 20 utilizing the fuel cell power limit controller 80 and regenerative brake power limit controller 82. The input to the fuel cell power limit controller 80 is the error between the Arbitrated Measured Volt and the Reference Volt, and the output is the fuel cell max power limit 160. The input to the regenerative brake power limit controller 82 is the error between the Arbitrated Measured Volt and the Reference Volt, and the output is the regen brake max power limit 170.

Further, the control law optimizes the recovered energy by first prioritizing reduction of the fuel cell max power limit 160 before reducing the regen brake max power limit 170. This prioritization conserves hydrogen fuel and take advantage of the no cost brake regen energy. During operation, the fuel cell power limit controller 80 is activated at 'Threshold1', which equals the Arbitrated Critical Threshold subtracted by an Offset 1. Similarly, the regen brake power limit controller 82 is activated at 'Threshold2', which equals the Arbitrated Critical Threshold subtracted by an Offset 2. In the example embodiment, Offsets 1 and 2 are internally defined calibratable numbers to offset from the Arbitrated Critical Threshold (e.g., a buffer) to allow power limit controllers 80, 82 to reduce voltage proactively before reaching the Arbitrated Critical Threshold.

FIG. 3 illustrates an example graph 200 of control sequences and the corresponding activated thresholds such as Threshold1, Threshold2, and Arbitrated Critical Threshold. During operation, the controller 70 is configured to continuously monitor voltage readings at each HV battery cell/module and the HV bus 36, and subsequently arbitrate the measured voltages and thresholds to determine an Arbitrated Measured Voltage 210, 'Threshold1' 220, 'Threshold2' 230, and Arbitrated Critical Threshold 240. Reference Voltage 250 is a calibratable number based on hardware and/or software specifications or safety levels, which may be set by the manufacturer as the intended operation level for that component.

Based on the arbitrated voltages and thresholds (e.g., FIG. 2), the fuel cell power limit controller 80 selectively controls a fuel cell maximum power limit 260 to the HV battery 32, which is between a normal or original fuel cell max power limit 262 and a minimum fuel cell max power limit 264. Similarly, based on the arbitrated voltages and thresholds, the regen brake power limit controller 82 selectively controls a regen brake maximum power limit 270 to the HV battery 32, which is at or below a normal or original regen brake max power limit 272.

With reference now to FIG. 4, and with continued reference to FIG. 3, an example control logic flow 300 for operating the powertrain control system 14 to prevent battery cell or HV bus over-voltage is provided. At step 302, control (e.g., controller 70) continuously monitors voltage readings at each battery cell/module of the HV battery 32 and the HV bus 36. At step 304, control subsequently arbitrates the measured voltages and thresholds, as previously described herein. At step 306, control determines if the Arbitrated Measured Voltage 210 is greater than Threshold2 230. If no, control proceeds to step 308. If yes, control proceeds to step 316.

At step 308, control determines if the Arbitrated Measured Voltage 210 is greater than Threshold1 220. If no, control proceeds to step 310. If yes, control proceeds to step 314.

At step 310, control commands a normal operation (without power limitation) with the fuel cell power limit controller 80 enabling the normal cell max power limit 262, and the regen brake power limit controller 82 enabling the normal regen brake max power limit 272. At step 312, control determines if the vehicle is shut down. If yes, control ends. If no, control returns to step 302.

At step 314, when the Arbitrated Measured Voltage 210 is greater than 'Threshold1' 220 (e.g., at time 't1' in FIG. 3), controller 70 enables/commands the fuel cell power limit controller 80 to reduce the fuel cell power output. This is shown, for example, between time 't1' and time 't2' on FIG. 3. Control then returns to step 302.

As previously discussed, control proceeds to step 316 when the Arbitrated Measured Voltage 210 is greater than 'Threshold2' 230. At step 316, controller 70 enables/commands the fuel cell power limit controller 80 to reduce the fuel cell maximum power limit 260 to the minimum value 264 with the fastest allowable rate. At step 318, control subsequently determines if the present Arbitrated Measured Voltage 210 is greater than 'Threshold2' 230 and a predetermined delay timer has expired (e.g., after reducing the fuel cell max power limit). If no, control returns to step 302. If yes, control proceeds to step 320. In this way, control can take further action if the delay timer is expired and the Arbitrated Measured Voltage is still above 'Threshold2', due to the reaction delay of the fuel cell system.

At step 320, control maintains the fuel cell maximum power limit at the minimum value 264, and enables/commands the regen brake power limit controller 82 to reduce the regen brake maximum power limit 270 (e.g., PIM 26 output), for example, as shown between time 't2' and time 't3'. In this way, control maintains the hydrogen fuel cell power limit to the minimum value, while the controller 70 enables the regen brake power limit controller 82 to manage the PIM 26 power output. Control then returns to step 302.

Described herein are systems and methods for preventing battery cell or HV bus over-voltage that could lead to loss of propulsion in a fuel cell electric vehicle. A powertrain control system monitors battery cell and HV bus voltage, and subsequently arbitrates the sensor readings and thresholds between the battery cells and the HV bus. The system first reduces only the fuel cell power output when the arbitrated measured voltage exceeds a first threshold. If the arbitrated measured voltage exceeds a higher, second threshold, the system further reduces the regen braking power output.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A fuel cell electric vehicle (FCEV), comprising:
   an electric traction motor configured to drive the FCEV and generate power through regenerative braking;
   a high voltage (HV) battery system including a HV bus and a HV battery configured to power the electric traction motor;
   a fuel cell stack (FCS) configured to generate electricity to recharge the HV battery and/or power the electric traction motor; and
   a powertrain control system for preventing over-voltage of the HV bus and HV battery, including a controller having one or more processors configured to control (i) a fuel cell power limit of the FCS, and (ii) a regenerative braking power limit of the electric traction motor,
   wherein the controller is programmed to:
      measure (i) a voltage of individual battery cells of the HV battery and (ii) a voltage of the HV bus;

determine an arbitrated measured voltage, which is a maximum of the measured voltage of the individual battery cells and the measured voltage of the HV bus, where the HV bus voltage has the same scale of the battery cell voltage by using the HV bus voltage divided by the number of individual battery cells;

first reduce the fuel cell power limit when the arbitrated measured voltage exceeds a first threshold to prevent over-voltage of the HV bus and/or the HV battery; and then reduce the regenerative braking power limit when the arbitrated measured voltage exceeds a second threshold, which is greater than the first threshold, to further prevent over-voltage of the HV bus and/or the HV battery.

2. The FCEV of claim 1, further comprising:

a motor control processor in signal communication with the electric traction motor and the controller;

a battery pack control module in signal communication with the HV battery and the controller; and a fuel cell processor in signal communication with the FCS and the controller.

3. The FCEV of claim 1, wherein the controller is further programmed to continuously arbitrate the measured voltage of the individual battery cells and the measured voltage of the HV bus.

4. The FCEV of claim 3, wherein the controller includes:

a fuel cell power limit controller to control the fuel cell power limit of the FCS; and a regenerative brake power limit controller to control the regenerative braking power limit of the electric traction motor.

5. The FCEV of claim 4, wherein the fuel cell power limit controller and the regenerative brake power limit controller are propositional derivative (PD) controllers.

6. The FCEV of claim 4, wherein the fuel cell power limit controller is programmed to reduce the fuel cell power limit when the arbitrated measured voltage exceeds the first threshold.

7. The FCEV of claim 6, wherein the regenerative brake power limit controller is programmed to reduce the regenerative braking power limit when the arbitrated measured voltage exceeds the second threshold.

8. The FCEV of claim 7, wherein the fuel cell power limit is reduced to a minimum value before the regenerative braking power limit is reduced.

9. A method of operating a powertrain control system to prevent over-voltage of a fuel cell electric vehicle (FCEV) having an electric traction motor, a high voltage (HV) battery system including a HV bus and a HV battery, a fuel cell stack (FCS), and a controller having one or more processors configured to control (i) a fuel cell power limit of the FCS and (ii) a regenerative braking power limit of the electric traction motor, the method comprising:

measuring, by the controller, a voltage of individual battery cells of the HV battery;

measuring, by the controller, a voltage of the HV bus;

determining, by the controller, an arbitrated measured voltage, which is a maximum of the measured voltage of the individual battery cells and the measured voltage of the HV bus, where the HV bus voltage has the same scale of the battery cell voltage by using the HV bus voltage divided by the number of individual battery cells;

reducing, by a fuel cell power limit controller, the fuel cell power limit when the arbitrated measured voltage exceeds a first threshold to prevent over-voltage of the HV bus and/or the HV battery; and reducing, by a regenerative brake power limit controller, the regenerative braking power limit when the arbitrated measured voltage exceeds a second threshold, which is greater than the first threshold, to further prevent over-voltage of the HV bus and/or the HV battery.

10. The method of claim 9, further comprising, by the controller, continuously arbitrating the measured voltage of the individual battery cells and the measured voltage of the HV bus.

11. The method of claim 9, wherein the fuel cell power limit is reduced to a minimum value before the regenerative braking power limit is reduced.

12. The method of claim 9, wherein the FCEV further includes:

a motor control processor in signal communication with the electric traction motor and the controller;

a battery pack control module in signal communication with the HV battery and the controller; and a fuel cell processor in signal communication with the FCS and the controller.

13. A fuel cell electric vehicle (FCEV), comprising:

an electric traction motor configured to drive the FCEV and generate power through regenerative braking;

a regenerative brake power limit controller to control the regenerative braking power limit of the electric traction motor;

a high voltage (HV) battery system including a HV bus and a HV battery configured to power the electric traction motor;

a fuel cell stack (FCS) configured to generate electricity to recharge the HV battery and/or power the electric traction motor;

a fuel cell power limit controller to control the fuel cell power limit of the FCS; and a powertrain control system for preventing over-voltage of the HV bus and HV battery, including a powertrain controller having one or more processors configured to control (i) a fuel cell power limit of the FCS via the fuel cell power limit controller, and (ii) a regenerative braking power limit of the electric traction motor via the regenerative brake power limit controller, wherein the powertrain controller is programmed to:

measure (i) a voltage of individual battery cells of the HV battery and (ii) a voltage of the HV bus;

continuously arbitrate the measured voltage of the individual battery cells and the measured voltage of the HV bus;

determine an arbitrated measured voltage, which is a maximum of the measured voltage of the individual battery cells and the measured voltage of the HV bus, where the HV bus voltage has the same scale of the battery cell voltage by using the HV bus voltage divided by the number of individual battery cells;

reduce, by the fuel cell power limit controller, the fuel cell power limit when the arbitrated measured voltage exceeds a first threshold; and reduce, by the regenerative brake power limit controller, the regenerative braking power limit when the arbitrated measured voltage exceeds a second threshold, which is greater than the first threshold, and wherein the fuel cell power limit is reduced to a minimum value before the regenerative braking power limit is reduced.

* * * * *